United States Patent
Morrison et al.

(10) Patent No.: US 6,681,189 B1
(45) Date of Patent: Jan. 20, 2004

(54) METHOD AND SYSTEM FOR DETERMINING FLOW RATES AND/OR FLUID DENSITY IN SINGLE AND MULTIPLE-PHASE FLOWS UTILIZING DISCHARGE COEFFICIENT RELATIONSHIPS

(75) Inventors: Gerald L. Morrison, College Station, TX (US); Kenneth R. Hall, College Station, TX (US)

(73) Assignee: The Texas A&M University System, College System, TX (US)

(*) Notice: Subject to any disclaimer, the term of this patent is extended or adjusted under 35 U.S.C. 154(b) by 0 days.

(21) Appl. No.: 09/938,025

(22) Filed: Aug. 22, 2001

(51) Int. Cl.[7] .............................. G01F 1/00; G01F 7/00
(52) U.S. Cl. ................. 702/45; 702/100; 73/861.61; 73/861.63
(58) Field of Search ............. 702/45, 100; 73/861.61, 73/861.02, 861.42, 861.52, 861.63

(56) References Cited

U.S. PATENT DOCUMENTS

| | | | |
|---|---|---|---|
| 1,503,371 A | 7/1924 | Meyer | 48/189.4 |
| 1,702,274 A | 2/1929 | Schmidt | 138/40 |
| 1,923,118 A | 8/1933 | Ruder et al. | 138/40 |
| 2,687,645 A | 8/1954 | Velten et al. | 73/861.61 |
| 3,602,432 A | 8/1971 | Mulready | 239/265.11 |
| 3,750,710 A | 8/1973 | Hayner | 138/40 |
| 3,838,598 A | 10/1974 | Tompkins | 73/861.52 |
| 4,015,473 A | 4/1977 | Kleuters et al. | 73/861.52 |
| 4,040,293 A | 8/1977 | Wilson | 73/861.61 |
| 4,335,605 A | 6/1982 | Boyd | 73/204.14 |
| 4,516,434 A * | 5/1985 | Halmi | 73/861.64 |
| 4,562,744 A | 1/1986 | Hall et al. | 73/861.02 |
| 4,592,390 A | 6/1986 | Boyd | 138/45 |
| 4,662,219 A | 5/1987 | Nguyen | 73/195 |
| 4,800,754 A | 1/1989 | Korpi | 73/202 |
| 4,841,781 A | 6/1989 | Khalifa | 73/861.22 |
| 5,115,687 A * | 5/1992 | Clingman, Jr. et al. | 73/863.03 |
| 5,295,397 A * | 3/1994 | Hall et al. | 137/44 |
| 5,341,848 A | 8/1994 | Laws | 138/44 |
| 5,461,932 A * | 10/1995 | Hall et al. | 138/40 |
| 5,551,305 A | 9/1996 | Farchi et al. | 73/861.04 |
| 6,345,536 B1 * | 2/2002 | Morrison et al. | 73/861.04 |
| 6,422,092 B1 * | 7/2002 | Morrison et al. | 73/861.04 |

FOREIGN PATENT DOCUMENTS

| | | | |
|---|---|---|---|
| EP | 0 684 458 A2 | 11/1995 | G01F/1/74 |
| WO | WO 00/14484 | 3/2000 | G01F/1/74 |

OTHER PUBLICATIONS

International Search Report in International Application No. PCT/US 00/17164, dated Jun. 21, 2000, 7 pages, Sep. 27, 2000.

International PCT Report dated Jan. 24, 2000 for PCT/US99/20984 filed Sep. 10, 1999.

* cited by examiner

Primary Examiner—John Barlow
Assistant Examiner—Anthony T. Dougherty
(74) Attorney, Agent, or Firm—Baker Botts L.L.P.

(57) ABSTRACT

According to one embodiment of the invention, a computerized method for determining a flow rate of a fluid flowing through a conduit having an obstruction flow meter includes receiving a β ratio value indicative of a β ratio of the obstruction flow meter, receiving a pressure differential value indicative of a pressure differential across the obstruction flow meter, receiving a density value indicative of a density of the fluid, receiving a discharge coefficient formula for the obstruction flow meter, the discharge coefficient formula being a function of the β ratio of the obstruction flow meter and an Euler number for the fluid flowing through the conduit, and determining, by the computer, the flow rate based on the received β ratio value, the received pressure differential value, the received density value, and the received discharge coefficient formula. The determined flow rate may either be the volumetric flow rate or the mass flow rate. Alternatively, the density of the fluid may be determined by providing the flow rate of the fluid, the β ratio of the obstruction flow meter, the pressure differential value, and the discharge coefficient formula.

34 Claims, 5 Drawing Sheets

METHOD AND SYSTEM FOR DETERMINING FLOW RATES AND/OR FLUID DENSITY IN SINGLE AND MULTIPLE-PHASE FLOWS UTILIZING DISCHARGE COEFFICIENT RELATIONSHIPS

TECHNICAL FIELD OF THE INVENTION

The present invention relates generally to the field of fluid flow measurement, and more particularly to a method and system for determining flow rates and/or fluid density in single and multiple-phase flows utilizing discharge coefficient relationships.

BACKGROUND OF THE INVENTION

Obstruction flow meters, such as orifices, venturi meters, and v-cones, are used to measure flow rates of fluids having one or more phases. Flow meters are calibrated to obtain a discharge coefficient, which is the ratio of actual flow rate to theoretical flow rate. Discharge coefficient equations are experimentally determined for obstruction flow meters. The equations obtained for use in calculating the discharge coefficient are complex and dependent upon the Reynolds number, pipe diameter, and $\beta$ ratio. Based on available data, the discharge coefficient may vary significantly with Reynolds number and pipe diameter. The complexity of the equations may lead to confusion and difficulty in the evaluation of the discharge coefficients since different terms must be discarded at different $\beta$ ratios.

SUMMARY OF THE INVENTION

According to one embodiment of the invention, a computerized method for determining a flow rate of a fluid flowing through a conduit having an obstruction flow meter includes receiving a $\beta$ ratio value indicative of a $\beta$ ratio of the obstruction flow meter, receiving a pressure differential value indicative of a pressure differential across the obstruction flow meter, receiving a density value indicative of a density of the fluid, receiving a discharge coefficient formula for the obstruction flow meter, the discharge coefficient formula being a function of the $\beta$ ratio of the obstruction flow meter and an Euler number for the fluid flowing through the conduit, and determining, by the computer, the flow rate based on the received $\beta$ ratio value, the received pressure differential value, the received density value, and the received discharge coefficient formula. The determined flow rate may either be the volumetric flow rate or the mass flow rate.

According to another embodiment of the invention, a computerized method for determining a density of a fluid flowing through a conduit having an obstruction flow meter includes receiving a $\beta$ ratio value indicative of a $\beta$ ratio of the obstruction flow meter, receiving a pressure differential value indicative of a pressure differential across the obstruction flow meter, receiving a flow rate value indicative of a flow rate of the fluid, receiving a discharge coefficient formula for the obstruction flow meter, the discharge coefficient formula being a function of the $\beta$ ratio of the obstruction flow meter and an Euler number for the fluid flowing through the conduit, and determining, by the computer, the density based on the received $\beta$ ratio value, the received pressure differential value, the received flow rate value, and the received discharge coefficient formula. The received flow rate may either be the volumetric flow rate or the mass flow rate.

According to an additional embodiment of the invention, a computerized method for determining a discharge coefficient formula for an obstruction flow meter coupled to a conduit includes receiving a plurality of first, second, and third data points, the first data points indicative of a measured discharge coefficient of the obstruction flow meter, the second data points indicative of an Euler number for a fluid flowing through the conduit, and the third data points indicative of a $\beta$ ratio of the obstruction flow meter, and determining, by the computer, the discharge coefficient formula for the obstruction flow meter from the first, second, and third data points, the discharge coefficient formula a function of the Euler number and the $\beta$ ratio.

Embodiments of the invention provide a number of technical advantages. Embodiments of the invention may include all, some, or none of these advantages. Defined relationships between applicable flow variables are easier to curve fit than traditional relationships, which allows more accurate calculation of discharge coefficient equations. New discharge coefficient relationships eliminate the need to know fluid viscosity, which increases the accuracy of flow rate calculations by eliminating the uncertainty of viscosity. In addition, eliminating viscosity and pipe diameter when determining a calibration curve equation simplifies these equations and, as a result, reduces the computing power necessary for flow rate measurements. New discharge coefficient relationships developed may be used for single and multiple-phase flows.

Other technical advantages are readily apparent to one skilled in the art from the following figures, descriptions, and claims.

BRIEF DESCRIPTION OF THE DRAWINGS

For a more complete understanding of the invention, and for further features and advantages, reference is now made to the following description, taken in conjunction with the accompanying drawings, in which.

DETAILED DESCRIPTION OF EXAMPLE EMBODIMENTS OF THE INVENTION

Example embodiments of the present invention and their advantages are best understood by referring now to FIGS. 1 through 10 of the drawings, in which like numerals refer to like parts.

Figure 1:
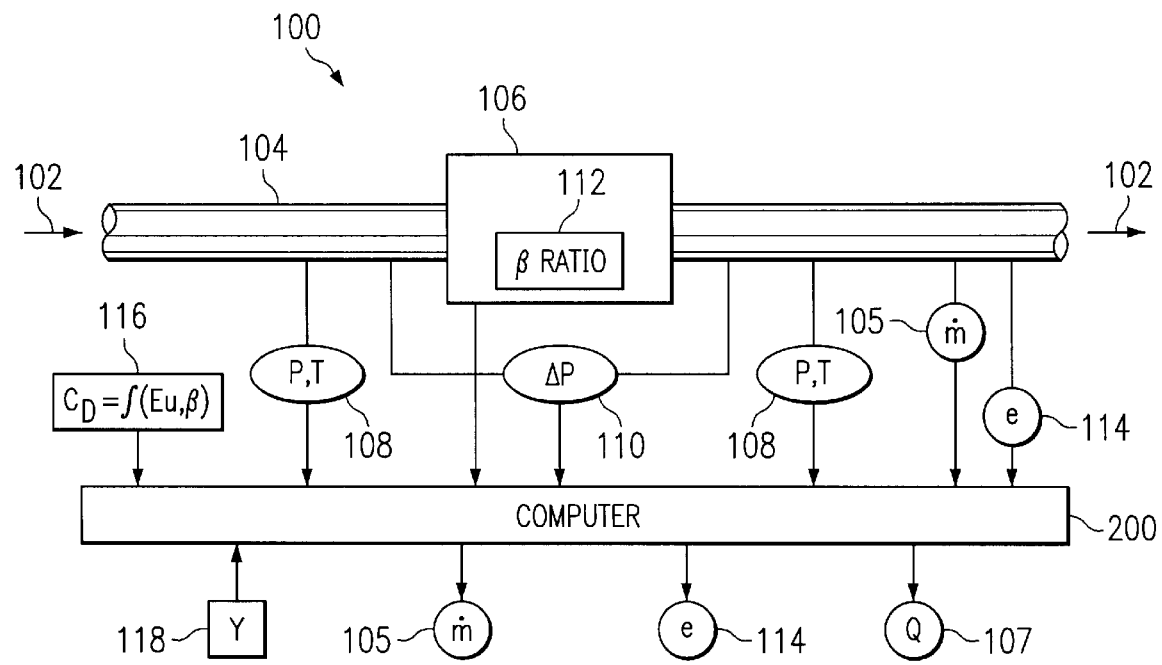
FIG. 1 is a schematic view of a piping system having an obstruction flow meter illustrating a determination of a flow rate or density of a single or multiple-phase fluid utilizing a new discharge coefficient relationship according to one embodiment of the present invention.

FIG. 1 is a schematic view of a piping system 100 illustrating a single or multiple-phase fluid 102 flowing through a conduit 104 having an obstruction flow meter 106. Conduit 104 may be any suitable conduit, such as a pipe, operable to transport fluid 102. According to the teachings of the present invention, obstruction flow meter 106 has associated therewith a discharge coefficient relationship 116 that is a function of the Euler number of fluid 102 flowing through obstruction flow meter 106 and a β ratio 112 of obstruction flow meter 106. β ratio 112 is defined as the square root of the ratio of the minimum open cross-sectional area of obstruction flow meter 106 divided by the upstream cross-sectional area of conduit 104. As discussed in more detail below, discharge coefficient relationship 116 is used in determining a mass flow rate 105 or volumetric flow rate 107 of fluid 102 given a density 114 of fluid 102, or determining density 114 given mass flow rate 105 or volumetric flow rate 107.

Obstruction flow meter 106 may be any suitable obstruction flow meter, such as an orifice, venturi meter, and a v-cone. Obstruction flow meter 106, like all obstruction flow meters, is calibrated to obtain discharge coefficient relationship 116. A discharge coefficient ("$C_d$") is the ratio of the actual flow rate of a fluid through a pipe to a theoretical flow rate. When discharge coefficient, $C_d$, is referred to in the following description, it should be understood that the flow coefficient, K, may be substituted in its place, wherein $K = C_d / \sqrt{1 - \beta^4}$.

Discharge coefficient equations are experimentally determined for obstruction flow meters. Existing discharge coefficient equations for obstruction flow meters are complex and dependent upon the Reynolds number, pipe diameter, and β ratio.

However, as discussed in more detail below, the present invention discloses computerized methods for determining new discharge coefficient relationships, such as discharge coefficient relationship 116, that are much easier to curve fit, which improves accuracy in fluid flow calculations. One method for determining discharge coefficient relationship 116 for obstruction flow meter 106 is outlined below in conjunction with FIG. 4.

FIG. 1 also shows piping system 100 having a computer 200 for use in determining mass flow rate 105, volumetric flow rate 107, or density 114 of fluid 102. Generally, computer 200 receives particular information about fluid 102 flowing through conduit 104. For example, pressure and temperature values 108 may be used to determine properties of fluid 102, such as density 114 for a single phase substance using an equation of state. However, pressure and temperature values 108 are not necessary for the calculation of mass flow rate 105 if density 114 is given. If mass flow rate 105 or volumetric flow rate 107 is an input and density 114 is calculated from the meter's response, again, pressure and temperature values 108 are not necessary. A differential pressure 110 across obstruction flow meter 106 is either directly or indirectly input into computer 200. In addition, users may input various parameters into computer 200, such as β ratio 112 of obstruction flow meter 106, density 114 (which may also be measured directly), discharge coefficient formula 116, and an expansion factor 118. Computer 200 then determines mass flow rate 105 or volumetric flow rate 107 utilizing any suitable computer program or programs, as discussed in further detail below in conjunction with FIG. 2. Alternatively, the density 114 of fluid 102 may be calculated from the meter's response if mass flow rate 105 or volumetric flow rate 107 is input instead of density 114.

Figure 2:
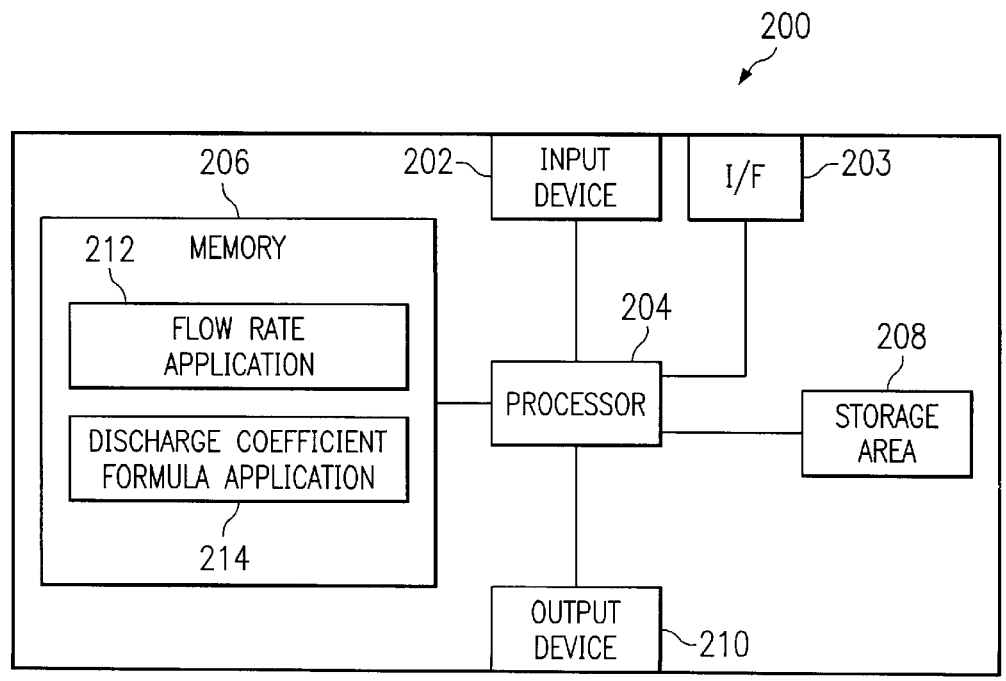
FIG. 2 is a block diagram of the computer of FIG. 1.

FIG. 2 illustrates computer 200 in block diagram form. As mentioned previously, computer 200 stores one or more computer programs for use in determining a flow rate of fluid 102. In one embodiment, computer 200 includes an input device 202, an interface 203, a processor 204, a memory 206, a storage area 208, and an output device 210. Computer 200 also includes a flow rate application 212 and a discharge coefficient formula application 214 stored in memory 206.

Input device 202 is coupled to processor 204 and is used for inputting information into computer 200, such as β ratio 112, density 114, discharge coefficient formula 116, and expansion factor 118. Input device 202 may also input other suitable information. In one embodiment, input device 200 is a keyboard; however, input device 200 may take other suitable forms. Interface 203 functions to receive information directly from measurements taken on piping system 100, such as pressure and temperature measurements from pressure and temperature taps as denoted by reference numerals 108 and 110. Interface 203 may be coupled to pressure and temperature taps or other sensors in any suitable manner.

Processor 204 may comprise any suitable type of processing unit that executes logic. One of the functions of the processor 204 is to receive information from input device 202 and interface 203 and store that information in either memory 206 or storage area 208. Processor 204 further functions to utilize flow rate application 212 to determine either mass flow rate 105 or volumetric flow rate 107, or functions to utilize discharge coefficient formula application 214 to determine discharge coefficient formula 116.

Memory 206 and storage area 208 may comprise a file, a stack, a database, or any other suitable organization of volatile or non-volatile memory. Memory 206 and storage area 208 may be random access memory ("RAM"), read only memory ("ROM"), CD-ROM, removable memory devices, or any other suitable devices that allow storage or retrieval of data. Memory 206 and storage area 208 are interchangeable and may perform the same functions.

Output device 210 may be any suitable visual display unit, such as a liquid crystal display ("LCD") or cathode ray tube ("CRT") display. Although not illustrated, output device 210 may be coupled to any suitable device for printing out or displaying results, such as a printer, chart recorder, or other digital recording device.

Flow rate application 212 is a computer program, or set of computer programs, written in any suitable computer language that is operable to receive information about fluid 102 and obstruction flow meter 106 and determine mass flow rate 105 or volumetric flow rate 107, as discussed more fully below in conjunction with FIG. 3. Alternatively, flow rate application 212 may be replaced by a density application (not shown), that is operable to receive information about fluid 102 and obstruction flow meter 106 and determine density 114 of fluid 102. Discharge coefficient formula application 214 is a computer program, or set of computer programs, written in any suitable computer language, that is operable to receive pertinent information for determining discharge coefficient formula 116, as discussed more fully below in conjunction with FIG. 4.

Figure 3:
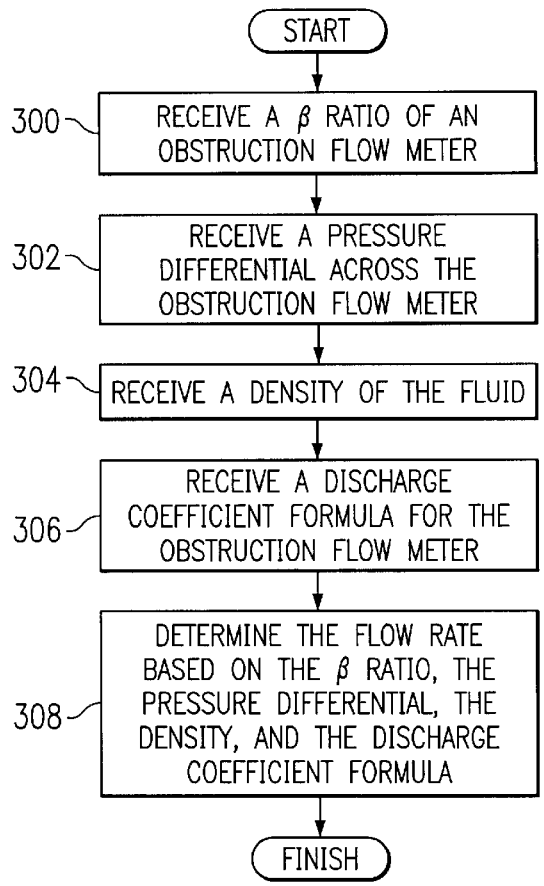
FIG. 3 is a flowchart demonstrating one computerized method for determining a flow rate of a fluid flowing through a conduit having an obstruction flow meter in accordance with one embodiment of the present invention.

FIG. 3 is a flowchart demonstrating one computerized method for determining a flow rate of fluid 102 flowing through conduit 104 having obstruction flow meter 106 in accordance with one embodiment of the present invention. The steps outlined in the flowchart may be executed by computer 200. The computerized method begins at step 300 where β ratio 112 of obstruction flow meter 106 is received by computer 200. Computer 200 typically receives β ratio 112 via input device 202. A typical value for β ratio 112 is 0.10-0.75; however, obstruction flow meter 106 may have any suitable β ratio 112 associated therewith.

Pressure differential 110 across obstruction flow meter 106 is received at step 302. The pressure taps used to measure differential pressure 110 are typically coupled directly to computer 200 through interface 203 so that a user does not have to input differential pressure 110. However, the pressure taps may be coupled to a separate pressure measuring device so that a user inputs pressure differential 110 into computer 200.

Density 114 of fluid 102 is received at step 304. Density 114 may either be input by a user using input device 202 of computer 200, or density 114 may be measured by any suitable device, such as a densitometer coupled to conduit 104. In the later case, the densitometer would also be coupled to interface 203 of computer 200 so that computer 200 may receive density 114 directly. If fluid 102 is a single phase fluid, then a suitable equation of state may be used to obtain density 114. If fluid 102 is a multiple-phase fluid, then the mixture density is used for density 114. The mixture density is given by:

$$\rho_{mixture} = \frac{\rho_{gas}\rho_{liquid}}{(1-X)\rho_{gas} + X\rho_{liquid}} \quad (1)$$

where:
$\rho_{mixture}$=mixture density
$\rho_{liquid}$=liquid density
$\rho_{gas}$=gas density at conduit 104 pressure and temperature
X=mixture quality based upon mass Discharge coefficient formula 116 for obstruction flow meter 106 is received at step 306. Discharge coefficient formula 116 is an experimentally predetermined formula that is input by a user via input device 202. In general, discharge coefficient formula 116 is a function of the Euler number of fluid 102 flowing through obstruction flow meter 106 and β ratio 112 of obstruction flow meter 106. One such method for determining discharge coefficient formula 116 is outlined below in conjunction with FIG. 4.

After computer 200 receives β ratio 112, pressure differential 110, density 114, and discharge coefficient formula 116, computer 200 determines mass flow rate 105 or volumetric flow rate 107 at step 308 based on the values of the above variables and the diameter of conduit 104. The determination of mass flow rate 105 or volumetric flow rate 107 is carried out by flow rate application 212. For example, since mass flow rate 105 equals density 114 times the velocity of fluid 102 times the inside area of conduit 104, the velocity of fluid 102 needs to be determined in order to calculate mass flow rate 105. One way of doing determining the velocity, U, of fluid 102 is to use the following equation:

$$C_d Y \sqrt{Eu} \frac{\beta^2}{\sqrt{1-\beta^4}} = 1 \text{ where: } Eu = \frac{\Delta P}{\frac{1}{2}\rho U^2} \quad (2)$$

Referring to equation (2), $C_d$ is discharge coefficient formula 116, as described in more detail below, expansion factor Y is input by a user or calculated by computer 200 from the geometry of obstruction flow meter 106 and measured properties in conduit 104, differential pressure 110 is measured, β ratio 112 is input, and density 114 is either measured or input into computer 200. This leaves as the only unknown variables in equation (2) the velocity, U, of fluid 102, and the discharge coefficient $C_d$, which is a function of known variables and velocity U (U being part of the Euler number). Processor 204 utilizes flow rate application 212 to iteratively arrive at velocity U. Computer 200 subsequently multiplies the velocity by the area of conduit 104 and density 114 to arrive at mass flow rate 105. One skilled in the art recognizes that density 114 may be determined using the above equation, given a flow rate of fluid 102.

Other suitable equations may be used to determine mass flow rate 105 or volumetric flow rate 107; however, according to the teachings of the present invention, discharge coefficient formula 116 expresses the discharge coefficient, $C_d$, as a function of the Euler number of fluid 102 flowing through conduit 104 and β ratio 112 of obstruction flow meter 106. This allows calculation of the discharge coefficient, $C_d$, in a more accurate manner, allowing more accurate flow rate calculations and measurements. Notably, discharge coefficient formula 116 is not explicitly dependent on viscosity, which is desirable because viscosity conventionally would have to be estimated, thus introducing error into the flow rate calculations. A computerized method for determining discharge coefficient formula 116 for obstruction flow meter 106 according to the teachings of the present invention is outlined below in conjunction with FIG. 4.

Figure 4:
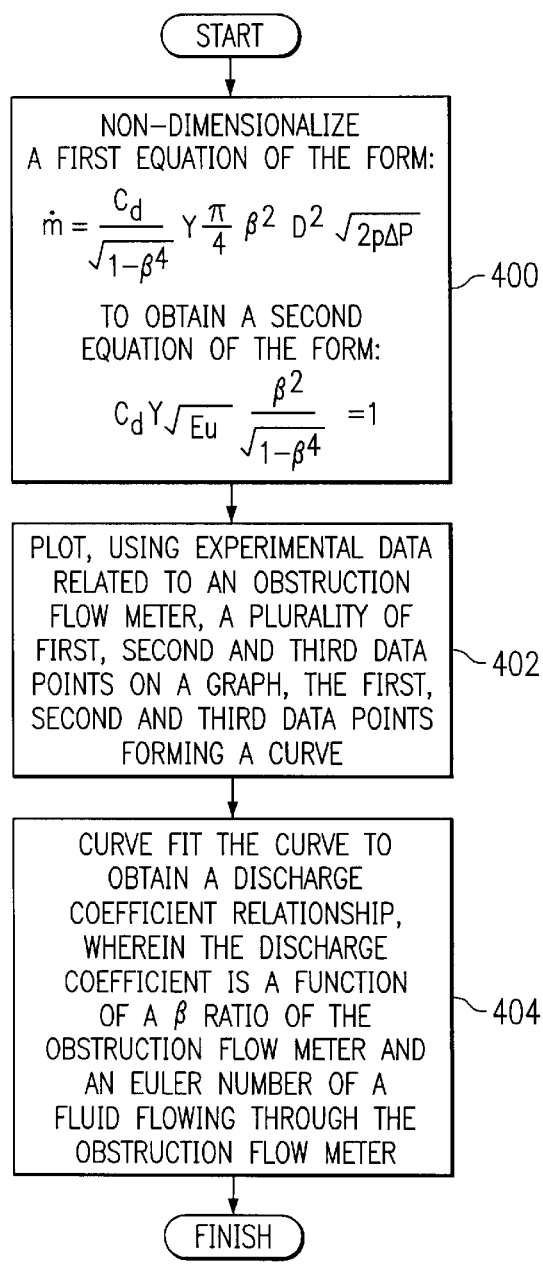
FIG. 4 is a flowchart demonstrating one computerized method for determining a discharge coefficient formula for an obstruction flow meter in accordance with one embodiment of the present invention.

Referring to FIG. 4, a first equation of the form:

$$\dot{m} = \frac{C_d}{\sqrt{1-\beta^4}} Y \frac{\pi}{4} \beta^2 D^2 \sqrt{2\rho\Delta P} \quad (3)$$

is non-dimensionalized to obtain a second equation of the form shown in equation (2).

Equation (3) is the general equation for the mass flow rate calculation of a fluid flowing through a pipe given the discharge coefficient for an obstruction flow meter. $\dot{m}$ is the mass flow rate, $C_d$ is the discharge coefficient, β is the ratio of the square root of the ratio of the minimum open cross-sectional area of the obstruction flow meter divided by the upstream cross-sectional area of the pipe, Y is the expansion factor, D is the pipe diameter, ρ is the fluid density, and ΔP is the pressure drop across the obstruction flow meter. The second equation (i.e., equation (2)) is obtained by non-dimensionalizing the first equation as follows. Both sides of equation (3) are divided by ρUA which represents $\dot{m}$. A in this case is the cross-sectional area, $\pi/4D^2$, of conduit 104. This leads to the following equation:

$$1 = \frac{C_d}{\sqrt{1-\beta^4}} Y \beta^2 \sqrt{\frac{2\rho \Delta P}{\rho^2 U^2}} \quad (4)$$

Those skilled in the art recognize that the term $$\sqrt{\frac{2\rho \Delta P}{\rho^2 U^2}}$$

equals the square root of the Euler number. Therefore, equation (2) is obtained.

At step 402, a plurality of first, second, and third data points are plotted, by computer 200, on a graph using experimental data related to obstruction flow meter 106. First, second, and third data points, which are discussed more fully below, form a curve (see, e.g., FIG. 7). The first data points are indicative of a measured discharge coefficient, $C_d$, of obstruction flow meter 106, the second data points are indicative of an Euler number for a fluid flowing through obstruction flow meter 106, and the third data points are indicative of a $\beta$ ratio of obstruction flow meter 106. The curve obtained from the plotting step is then curve fit, at step 404, by computer 200 utilizing discharge coefficient formula application 214 to obtain discharge coefficient relationship 116. Curve fitting may be performed according to steps well known in the art. As described above, discharge coefficient relationship 116 expresses $C_d$ as a function of $\beta$ ratio 112 and the Euler number of fluid 102 flowing through obstruction flow meter 106. One example of the results of the curve fit is as follows:

$$C_d = \frac{Eu}{6.09 - \frac{5.48}{\beta \sqrt{Eu}} + 0.605 Eu^2 \beta^4} \quad (5)$$

The equation resulting from the curve fit in step 404, such as equation (5), may be substituted into equation (2) above so that flow rate application 212 can be utilized to determine mass flow rate 105 or volumetric flow rate 107 at step 308 (FIG. 3). As described in more detail below, a plurality of fourth data points may be used to form the curve as outlined in FIG. 7. These fourth data points are indicative of the inside diameter of conduit 104. Adding the fourth data points increases the accuracy of the curve fit as outlined in step 404.

FIGS. 5 through 9 illustrate one technical advantage of the present invention. FIGS. 5 through 9 illustrate that the new discharge coefficient relationships developed according to the teachings of the present invention are much easier to curve fit, which gives more accurate discharge coefficient equations.

Figure 5:
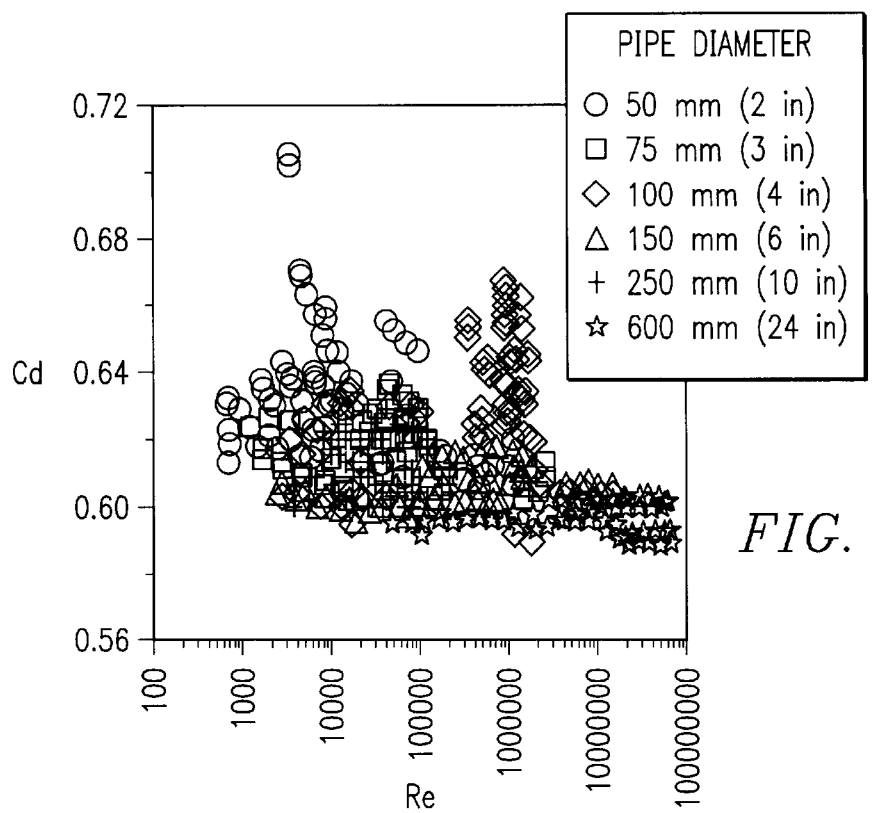
FIG. 5 illustrates measured discharge coefficients from the GRI/NIST database as a function of the Reynolds number and pipe diameter for a standard orifice flow meter.

FIG. 5 illustrates a discharge coefficient $C_d$ as a function of the Reynolds number and pipe diameter for flange pressure taps on a standard orifice flow meter. The data represented in FIG. 5 is the entire data set contained in GRI/NIST *Orifice Meter Discharge Coefficient Database, Version* 1.0 by Scott, Brennan and Blakeslee (1994). These data were obtained for flows using nitrogen, air, water, gas-oil, and natural gas for $\beta$ ratios from 0.10 to 0.75 for flange tap orifice flow meters. As illustrated in FIG. 5, $C_d$ varies significantly with pipe diameter and Reynolds number.

Figure 6:
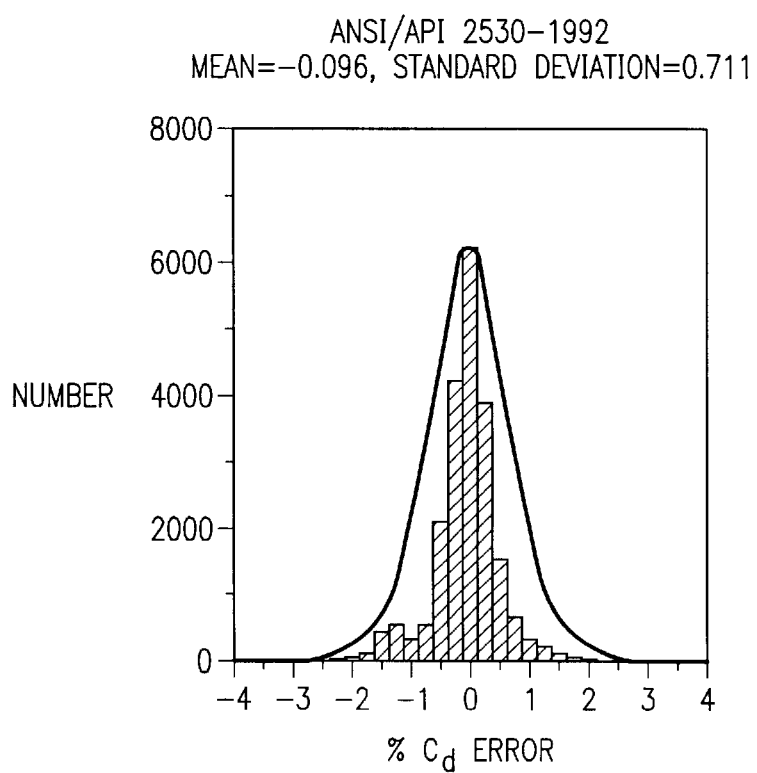
FIG. 6 illustrates the percent error in calculated discharge coefficient values using ANSI/API 2530–1992 compared to the measured discharge coefficient values in FIG. 5, in which the mean equals −0.096 and the standard deviation is 0.711.

FIG. 6 is a histogram illustrating the percent error in calculated discharge coefficient values using ANSI/API 2530-1992 compared to the measured discharge coefficient values illustrated in FIG. 5. According to the histogram, the mean of the error is −0.096 with a standard deviation of 0.711. The GRI/NIST database includes some data for non-ideal flow conditions where there may be a reducer or some other item upstream of the orifice flow meter. These data result in a larger standard deviation of the ANSI/API 2530 $C_d$ calculation. In fact, the secondary peak below the −1% difference is most assuredly due to these non-ideal flow conditions. The complexity of the equations provided in ANSI/API 2530 may lead to confusion and difficulty in the evaluation of the discharge coefficient since different terms must be discarded at different $\beta$ ratios. In contrast, the present invention presents a simpler and more universal method to determine discharge coefficient formulas for obstruction flow meters.

Figure 7:
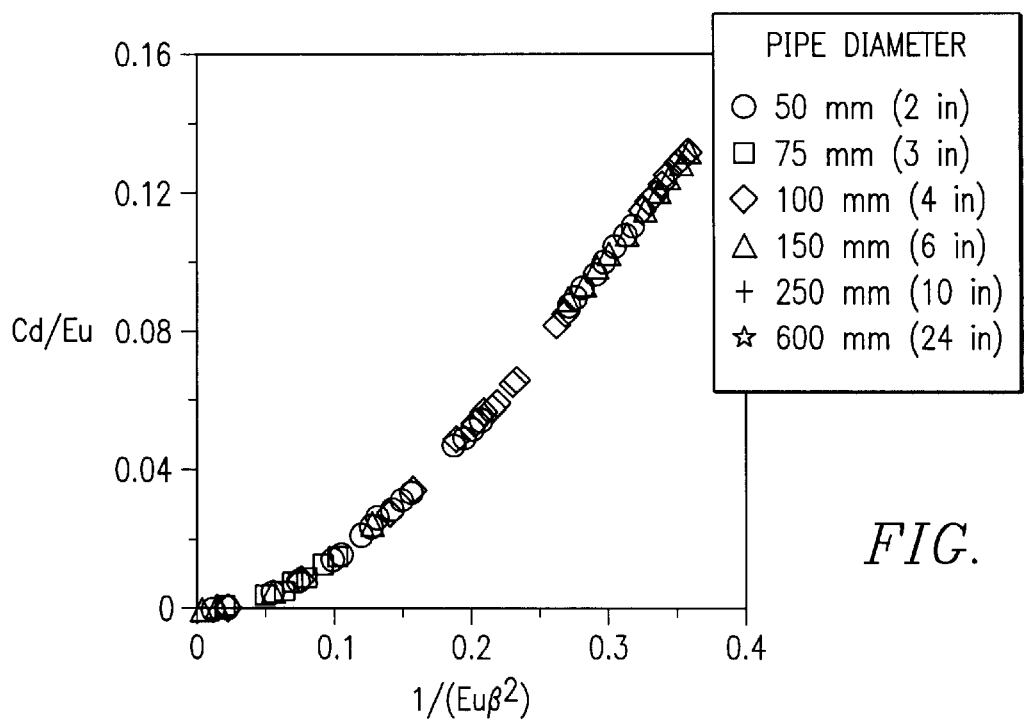
FIG. 7 illustrates measured discharge coefficients from the GRI/NIST database as a function of the Euler number and $\beta$ ratio for a standard orifice flow meter.

FIG. 7 illustrates measured discharge coefficients from the GRI/NIST database as a function of the Euler number and $\beta$ ratio for a standard orifice flow meter. The Euler number was calculated by using equation (3) along with the other data listed in the GRI/NIST database to calculate the mass flow rate. From this, the velocity U in the pipe was calculated. This value of U, along with the tabulated values of $\Delta P$ and density, were used to calculate the Euler number. FIG. 7 illustrates the results. The graph illustrated in FIG. 7 includes thousands of data points recorded at eight different installations, for five different fluids, in pipes from approximately two inches to approximately twenty-four inches in diameter and $\beta$ ratios from 0.10 to 0.75. The data follow a single curve very closely which exhibits a smooth trend with $$\frac{C_d}{Eu}$$

increasing monotonically with $$\frac{1}{Eu\beta^2}.$$

Comparing FIGS. 5 and 7 shows that a simple curve fit is possible for the data in FIG. 7 while the spread of data in FIG. 5 eliminates the possibility of a simple curve fit in terms of the Reynolds number. The elimination of fluid viscosity from the equations used to calculate discharge coefficient formula 116 both simplifies the calculation and increases its accuracy by eliminating the uncertainty in one additional term, viscosity. As described above, the accuracy of the curve fit may be increased by adding the diameter of conduit 104 as another independent variable. This is due to the fact that the geometry of the orifice plate and the location of the pressure taps vary with pipe diameter.

Figure 8:
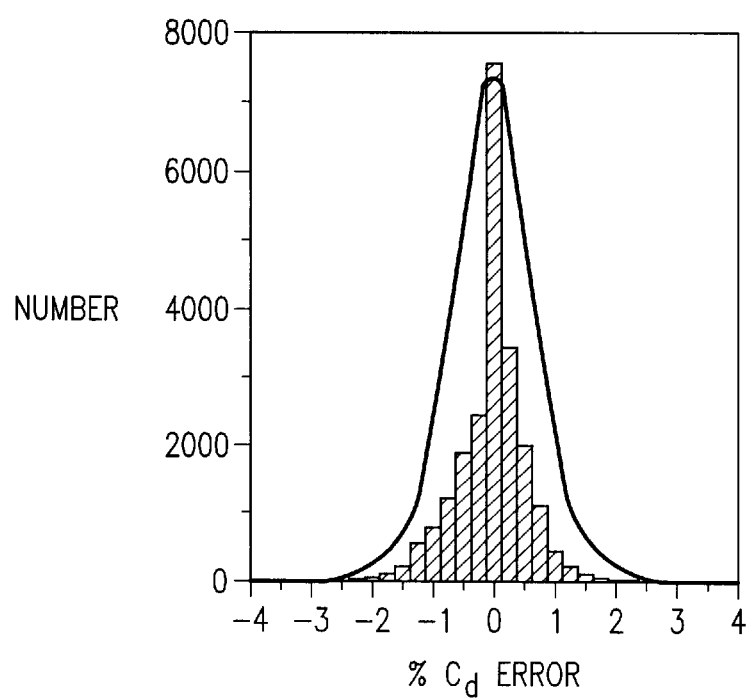
FIG. 8 illustrates the percent error in calculated discharge coefficient values using a discharge coefficient formula determined according to the teachings of the present invention compared to the measured discharge coefficient values in FIG. 7, in which the mean equals −0.001 and the standard deviation is 0.604.

FIG. 8 is a histogram illustrating the percent error and calculated discharge coefficient values using a discharge coefficient formula determined according to the teachings of the present invention compared to the measured discharge coefficient values in FIG. 7. The mean of the error in FIG. 7 is −0.001 with a standard deviation of 0.604. Comparing this to FIG. 6, the mean of the error is much less for the new discharge coefficient relationships 116 to the ANSI/API relationship. In addition, the standard deviation of the new discharge coefficient relationships 116 is smaller by approximately 15% compared to the ANSI/API relationship. Accordingly, discharge coefficient relationship 116 is more accurate, considerably easier to calculate, and not dependent upon fluid viscosity.

Even though the GRI/NIST database was used to illustrate the technical advantages of the present invention, other databases having experimental data may be utilized in determining discharge coefficient relationship 116.

Figure 9:
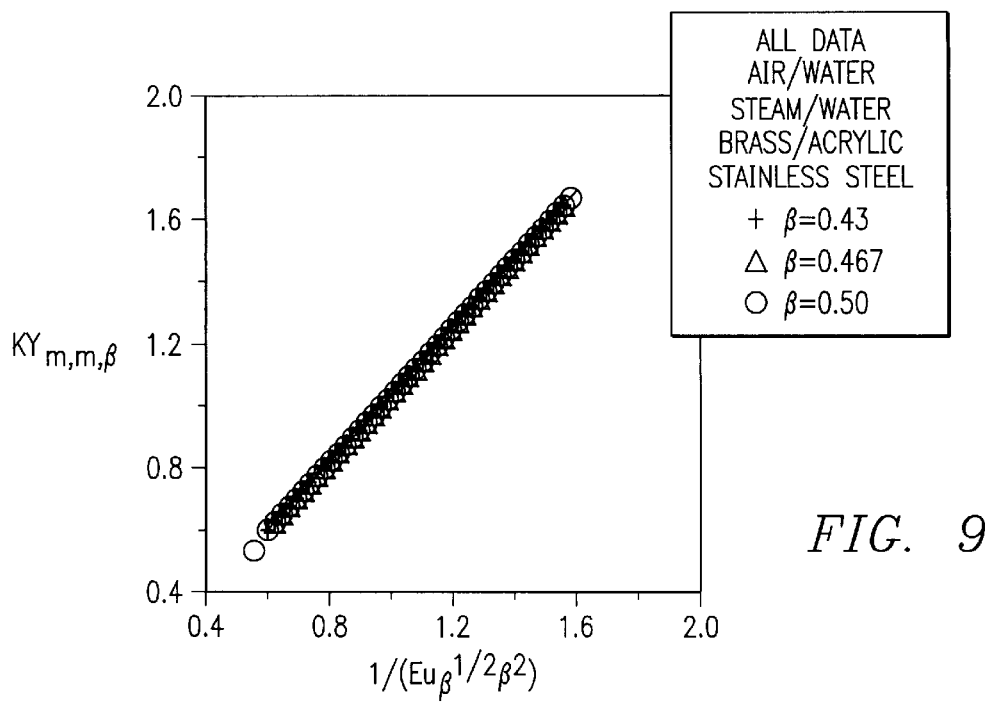
FIG. 9 illustrates measured discharge coefficients as a function of the Euler number and β ratio for three different β ratio slotted orifice flow meters for single and two-phase flows.

FIG. 9 illustrates measured flow coefficients, K, times expansion factor, Y, as a function of the Euler number and β ratio for three different β ratio slotted orifice flow meters for single and two-phase flows. One example of slotted orifice flow meters may be found in U.S. Pat. No. 5,295,397 to Hall, et al. FIG. 9 shows that the expression of a flow coefficient (i.e., discharge coefficient) as a function of the Euler number and β ratio is valid for two different types of obstruction flow meters and is also valid for multiple-phase flow for varying orifices. An important technical advantage here is that discharge coefficient formula 116 applies for phase changing (steam/water) and non-phase changing (air/water) flow mixtures. FIG. 9 also shows that Y may be coupled with the flow coefficient, K, to eliminate Y as an individually calculated quantity, thus reducing complexity of the discharge coefficient equations and increasing accuracy.

Figure 10:
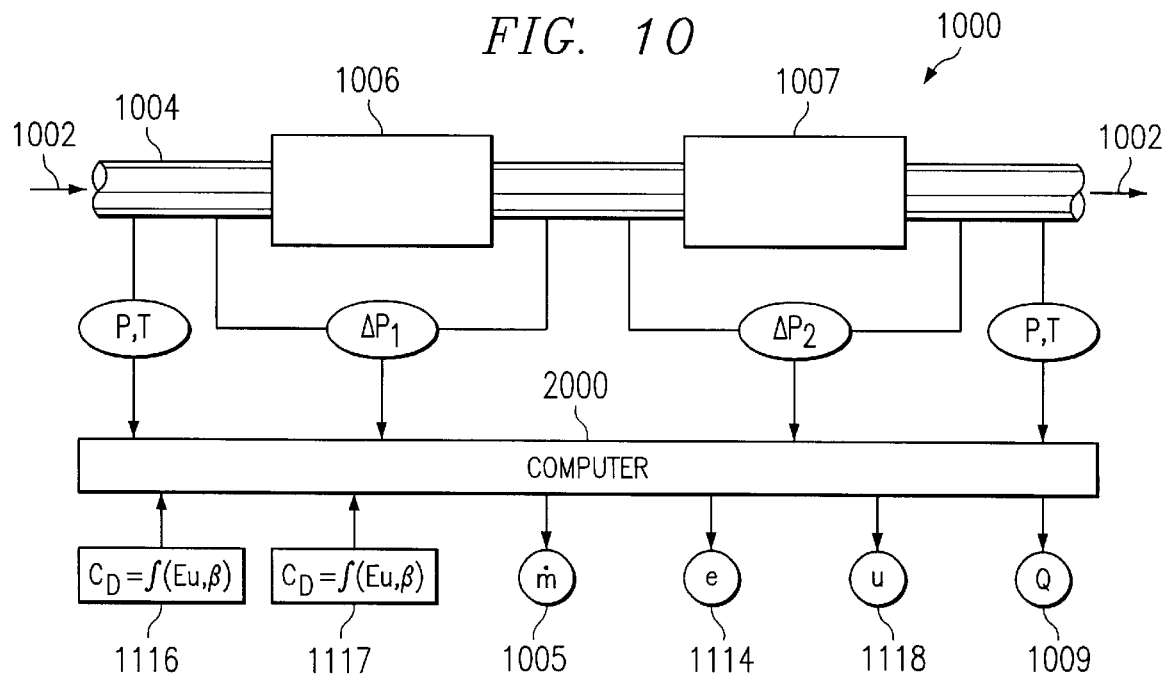
FIG. 10 is a schematic view of a piping system having two obstruction flow meters in series illustrating a determination of a flow rate and a density of a multiple-phase fluid utilizing new discharge coefficient relationships according to one embodiment of the present invention.

FIG. 10 is a schematic view of a piping system 1000 having a first obstruction flow meter 1006 and a second obstruction flow meter 1007 in series illustrating, in one embodiment, a determination of a mass flow rate 1005 of a multiple-phase fluid 1002 utilizing a discharge coefficient relationship 1116 and a discharge coefficient relationship 1117 according to one embodiment of the present invention. FIG. 10 is similar to FIG. 1 except that an extra obstruction flow meter is included in piping system 1000. Second obstruction flow meter 1007 may be a different type of obstruction flow meter than first obstruction flow meter 1006 or may be the same type of obstruction flow meter but with a different β ratio. Either way, a different discharge coefficient relationship 1117 results. In other embodiments, second obstruction flow meter 1007 does not have to be an obstruction flow meter. It may be any type of meter that may measure density 1114, mass flow rate 1005, or volumetric flow rate 1009, such as a densitometer, turbine meter, or positive displacement flow meter.

Using the teachings of the present invention outlined above, a computer 2000 is able to solve for a density 1114 and a velocity 1118 of fluid 1002 simultaneously using two equations with two unknowns. Again, the accuracy of the calculation of these values is greater using discharge coefficient relationships 1116 and 1117, which as described above, are a function of the Euler number of fluid 1002 flowing through conduit 1004 and a respective β ratio 1112 and 1113 of obstruction flow meters 1006 and 1007.

FIG. 10 is another example of when discharge coefficient relationships determined according to the teachings of the present invention may be used to calculate the flow rate or density of multiple-phase fluids. An example of a calculation of the mass flow rate of a multiple-phase fluid is disclosed in U.S. patent application Ser. Nos. 09/151,253 and 09/393,715, which are herein incorporated by reference. Other systems or equations that utilize discharge coefficient equations to determine a flow rate of a fluid flowing through a conduit can similarly benefit from the teachings of the present invention. Generally, if equations for flow rate involve an unknown velocity, U, then a discharge coefficient is not explicitly calculated but a discharge coefficient relationship is utilized to reduce the equation to one unknown variable, U.

Although embodiments of the invention and their advantages are described in detail, a person skilled in the art could make various alterations, additions, and omissions without departing from the spirit and scope of the present invention as defined by the appended claims.

What is claimed is:

1. A computerized method for determining a flow rate of a fluid flowing through a conduit having an obstruction flow meter, comprising:

receiving a β ratio value indicative of a β ratio of the obstruction flow meter;

receiving a pressure differential value indicative of a pressure differential across the obstruction flow meter;

receiving a density value indicative of a density of the fluid;

receiving a discharge coefficient formula for the obstruction flow meter, the discharge coefficient formula being a function of the β ratio of the obstruction flow meter and an Euler number for the fluid flowing through the conduit; and determining, by the computer, the flow rate based on the received β ratio value, the received pressure differential value, the received density value, and the received discharge coefficient formula.

2. The computerized method of claim 1, wherein determining the flow rate comprises determining the mass flow rate.

3. The computerized method of claim 1, wherein determining the flow rate comprises determining the volumetric flow rate.

4. The computerized method of claim 1, wherein the fluid is a multiple-phase fluid.

5. The computerized method of claim 4, wherein receiving the density value comprises receiving a density value indicative of a mixture density of the multiple-phase fluid.

6. The computerized method of claim 1, wherein receiving the discharge coefficient formula for the obstruction flow meter comprises determining a discharge coefficient formula for an obstruction flow meter, the discharge coefficient formula a function of the β ratio of the obstruction flow meter and the Euler number for the fluid flowing through the conduit.

7. The computerized method of claim 6, wherein determining the discharge coefficient formula for the obstruction flow meter comprises:

receiving a plurality of first, second, and third data points, the first data points indicative of a measured discharge coefficient of the obstruction flow meter, the second data points indicative of the Euler number, and the third data points indicative of the β ratio; and determining, by the computer, the discharge coefficient formula for the obstruction flow meter from the first, second, and third data points, the discharge coefficient formula a function of the Euler number and the β ratio.

8. The computerized method of claim 7, wherein the discharge coefficient formula has a form:

$$C_d = \frac{Eu}{K_1 - \frac{K_2}{\beta\sqrt{Eu}} + K_3 Eu^2 \beta^4}$$

where $K_1$, $K_2$, and $K_3$ are constants.

9. The computerized method of claim 7, wherein receiving the first, second, and third data points comprises plotting, by the computer, the first, second, and third data points on a graph having an x-axis representing the Euler number, a y-axis representing the β ratio, and a z-axis representing the measured discharge coefficient.

10. The computerized method of claim 7, wherein receiving the first, second, and third data points comprises receiving a plurality of first, second, third, and fourth data points, the fourth data points indicative of a diameter of the conduit.

11. The computerized method of claim 7, wherein determining, by the computer, the discharge coefficient formula comprises curve fitting a curve defined by the plurality of first, second, and third data points.

12. A computer system for calculating a flow rate of a fluid flowing through a conduit having an obstruction flow meter, comprising:
  a computer-readable memory;
  a processor coupled to the memory;
  a computer program stored in the memory, the computer program, when executing on the processor, operable to:
    receive a β ratio value indicative of a β ratio of the obstruction flow meter;
    receive a pressure differential value indicative of a pressure differential across the obstruction flow meter;
    receive a density value of a density of the fluid;
    receive a discharge coefficient formula for the obstruction flow meter, the discharge coefficient formula being a function of the β ratio of the obstruction flow meter and an Euler number for the fluid flowing through the conduit; and
    determine the flow rate based on the received β ratio value, the received pressure differential value, the received density value, and the received discharge coefficient formula.

13. The system of claim 12, wherein the fluid is a multiple-phase fluid and the computer program is further operable to receive a density value indicative of a mixture density of the multiple-phase fluid.

14. The system of claim 12, wherein the computer program is further operable to determine a discharge coefficient formula for an obstruction flow meter, the discharge coefficient formula a function of the β ratio of the obstruction flow meter and the Euler number for the fluid flowing through the conduit.

15. The system of claim 12, wherein the computer program is further operable to determine the mass flow rate.

16. The system of claim 12, wherein the computer program is further operable to determine the volumetric flow rate.

17. The system of claim 12, wherein the computer program is further operable to:
  receive a plurality of first, second, and third data points, the first data points indicative of a measured discharge coefficient, the second data points indicative of the Euler number, and the third data points indicative of the β ratio; and
  determine the discharge coefficient formula for the obstruction flow meter from the first, second, and third data points, the discharge coefficient formula a function of the Euler number and the β ratio.

18. The system of claim 17, wherein the discharge coefficient formula has a form:

$$C_d = \frac{Eu}{K_1 - \frac{K_2}{\beta\sqrt{Eu}} + K_3 Eu^2 \beta^4}$$

where $K_1$, $K_2$, and $K_3$ are constants.

19. The system of claim 17, wherein the computer program is further operable to plot the first, second, and third data points on a graph having an x-axis representing the Euler number, a y-axis representing the β ratio, and a z-axis representing the measured discharge coefficient.

20. The system of claim 17, wherein the computer program is further operable to receive a plurality of first, second, third, and fourth data points, the fourth data points indicative of a diameter of the conduit.

21. The system of claim 17, wherein the computer program is further operable to curve fit a curve defined by the plurality of first, second, and third data points.

22. A computerized method for determining a density of a fluid flowing through a conduit having an obstruction flow meter, comprising:
  receiving a β ratio value indicative of a β ratio of the obstruction flow meter;
  receiving a pressure differential value indicative of a pressure differential across the obstruction flow meter;
  receiving a flow rate value indicative of a flow rate of the fluid;
  receiving a discharge coefficient formula for the obstruction flow meter, the discharge coefficient formula being a function of the β ratio of the obstruction flow meter and an Euler number for the fluid flowing through the conduit; and
  determining, by the computer, the density based on the received β ratio value, the received pressure differential value, the received flow rate value, and the received discharge coefficient formula.

23. The computerized method of claim 22, wherein the fluid is a multiple-phase fluid and determining, by the computer, the density comprises determining a mixture density of the multiple-phase fluid.

24. A computerized method for determining a discharge coefficient formula for an obstruction flow meter coupled to a conduit, comprising:
  receiving a plurality of first, second, and third data points, the first data points indicative of a measured discharge coefficient of the obstruction flow meter, the second data points indicative of an Euler number for a fluid flowing through the conduit, and the third data points indicative of a β ratio of the obstruction flow meter; and
  determining, by the computer, the discharge coefficient formula for the obstruction flow meter from the first, second, and third data points, the discharge coefficient formula a function of the Euler number and the β ratio.

25. The computerized method of claim 24, wherein receiving the first, second, and third data points comprises plotting, by the computer, the first, second, and third data points on a graph having an x-axis representing the Euler number, a y-axis representing the β ratio, and a z-axis representing the measured discharge coefficient.

26. The computerized method of claim 24, wherein receiving the first, second, and third data points comprises receiving a plurality of first, second, third, and fourth data points, the fourth data points indicative of a diameter of the conduit.

27. The computerized method of claim 24, wherein the fluid is a multiple-phase fluid.

28. A computer system for determining a discharge coefficient formula for an obstruction flow meter coupled to a conduit, comprising:
  a computer-readable memory;
  a processor coupled to the memory;
  a computer program stored in the memory, the computer program, when executing on the processor, operable to:
    receive a plurality of first, second, and third data points, the first data points indicative of a measured discharge coefficient of the obstruction flow meter, the second data points indicative of an Euler number for a fluid flowing through the conduit, and the third data points indicative of a β ratio of the obstruction flow meter; and
    determine the discharge coefficient formula for the obstruction flow meter from the first, second, and third data points, the discharge coefficient formula a function of the Euler number and the β ratio.

29. The system of claim 28, wherein the computer program is further operable to plot the first, second, and third data points on a graph having an x-axis representing the Euler number, a y-axis representing the β ratio, and a z-axis representing the measured discharge coefficient.

30. The system of claim 28, wherein the computer program is further operable to receive a plurality of first, second, third, and fourth data points, the fourth data points indicative of a diameter of the conduit.

31. The system of claim 28, wherein the fluid is a multiple-phase fluid.

32. A computerized method for determining a flow rate of a fluid flow, comprising:

receiving a plurality of parameters that may be used to determine the flow rate of the fluid flow through a conduit having one or more obstruction flow meters given a discharge coefficient formula for each of the one or more obstruction flow meters;

receiving the discharge coefficient formula for each of the one or more obstruction flow meters, the discharge coefficient formula being a function of a β ratio of a respective obstruction flow meter and an Euler number for the fluid flowing through the respective obstruction flow meter; and determining, by the computer, the flow rate based on the received plurality of parameters and the received discharge coefficient formula.

33. The computerized method of claim 32, wherein determining the flow rate comprises determining the mass flow rate.

34. The computerized method of claim 32, wherein determining the flow rate comprises determining the volumetric flow rate.

* * * * *